US006761991B2

(12) United States Patent
Frisch et al.

(10) Patent No.: US 6,761,991 B2
(45) Date of Patent: Jul. 13, 2004

(54) SEALS FOR FUEL CELLS AND FUEL CELL STACKS

(75) Inventors: Lawrence Eugene Frisch, Midland, MI (US); Randall Allen Herring, Saginaw, MI (US); Myron Timothy Maxson, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 360 days.

(21) Appl. No.: 09/978,293

(22) Filed: Oct. 16, 2001

(65) Prior Publication Data

US 2003/0072988 A1 Apr. 17, 2003

(51) Int. Cl.$^7$ .............................. H01M 8/02; H01M 2/08
(52) U.S. Cl. .......................................... 429/35; 429/36
(58) Field of Search ........................... 429/34, 35, 36

(56) References Cited

U.S. PATENT DOCUMENTS

| | | | |
|---|---|---|---|
| 2,614,906 A | 10/1952 | Spialter et al. | 23/182 |
| 3,043,660 A | 7/1962 | Hughes et al. | 23/182 |
| 3,337,309 A | 8/1967 | Harper | 260/32.8 |
| 3,677,998 A | 7/1972 | Young | 260/33.6 |
| 3,794,556 A | 2/1974 | Young | 161/206 |
| 3,960,800 A | 6/1976 | Kohl, Jr. | 260/32.8 |
| 4,082,726 A | 4/1978 | Mine et al. | 260/46.5 |
| 4,087,585 A | 5/1978 | Schulz | 428/429 |
| 4,185,041 A | 1/1980 | Griffin | 525/188 |
| 4,269,991 A | 5/1981 | Homan et al. | 556/427 |
| 4,719,262 A | 1/1988 | Plueddemann | 525/105 |
| 4,732,932 A | 3/1988 | Waldern | 524/862 |
| 4,751,153 A * | 6/1988 | Roth | 429/35 |
| 4,865,793 A | 9/1989 | Suzuki et al. | 264/278 |
| 5,516,122 A | 5/1996 | Caffee | 277/167.5 |
| 5,789,084 A | 8/1998 | Nakamura et al. | 428/447 |
| 5,973,067 A | 10/1999 | Nakamura et al. | 524/858 |
| 6,080,503 A | 6/2000 | Schmid et al. | 429/35 |
| 6,086,643 A * | 7/2000 | Clark et al. | 429/36 X |
| 6,124,407 A | 9/2000 | Lee et al. | 525/478 |
| 6,153,326 A | 11/2000 | Matsukawa et al. | 429/34 |
| 6,261,711 B1 | 7/2001 | Matlock et al. | 429/34 |
| 6,280,870 B1 | 8/2001 | Eisman et al. | 429/34 |
| 6,596,427 B1 * | 7/2003 | Wozniczka et al. | 429/35 X |
| 6,610,435 B1 * | 8/2003 | Maruyama et al. | 429/34 |
| 2002/0197519 A1 * | 12/2002 | Einhart et al. | 429/34 X |

FOREIGN PATENT DOCUMENTS

| | | | |
|---|---|---|---|
| EP | 0870587 A2 | 10/1998 | B29C/45/00 |
| EP | 0870587 A3 | 10/1998 | B29C/45/00 |
| JP | 61-285674 | 12/1986 | H01M/8/02 |

* cited by examiner

Primary Examiner—Stephen J. Kalafut
(74) Attorney, Agent, or Firm—Jim L. DeCesare (57) ABSTRACT

This is an improvement in a fuel cell stack assembly having a plurality of plates with grooves for accommodating gaskets to provide seals between individual fuel cell plates in the fuel cell stack assembly in order to prevent leakage of gases and liquids required for operation of the fuel cell stack assembly. The improvement comprising grooves in each fuel cell plate in the fuel cell stack assembly with a circular or an elliptical profile, and a unitary seal formed of a sealing material between each fuel cell plate in the fuel cell stack assembly having a profile corresponding to the profile of the grooves in each fuel cell plate.

10 Claims, 6 Drawing Sheets

SEALS FOR FUEL CELLS AND FUEL CELL STACKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to fuel cells, and more particularly to the design of a groove profile for use in forming seals between different elements of a conventional fuel cell or fuel stack assembly, to prevent leakage of gases and liquids required for operation of the individual fuel cells. The invention also relates to the formation of such seals with a novel sealing material.

BACKGROUND OF THE INVENTION

There are various types of known fuel cells. One type of fuel cell currently considered practical for use in many applications is a fuel cell employing a proton exchange membrane (PEM). PEM fuel cells enables simple, compact fuel cells to be designed, which are robust, can be operated at temperatures not too different from ambient temperature, and which do not have complex requirements with respect to fuel, oxidant, and coolant supplies.

A single conventional fuel cell generates a relatively low voltage. In order to provide a useable amount of power, therefore, fuel cells are commonly configured into fuel cell stacks typically containing 10, 20, 30, and even 100's or more fuel cells in a single stack. While this provides a single unit capable of generating useful amounts of power at usable voltages, the design can be complex, and can include numerous elements all of which must be carefully assembled.

For example, a conventional PEM fuel cell requires two flow field plates, an anode flow field plate, and a cathode flow field plate. A membrane electrode assembly (MEA) including the actual proton exchange membrane is provided between the two flow field plates. Additionally, a gas diffusion media or layer (GDM/GDL) is sandwiched between each flow field plate and the proton exchange membrane. The gas diffusion media enables diffusion of an appropriate gas, either the fuel or the oxidant, to the surface of the proton exchange membrane, while at the same time providing conduction of electricity between the associated flow field plate and the PEM.

This type of a basic cell structure itself requires two seals, with each seal being provided between one of the flow field plates and the PEM. Moreover, the seals have to be of relatively complex configuration. In particular, and as detailed below, the flow field plates for use in the fuel cell stack have to provide a number of functions, and a complex sealing arrangement is therefore required.

For a fuel cell stack, the flow field plates typically provide apertures or openings at either end so that a stack of flow field plates defines elongate channels extending perpendicularly to the flow field plates. As fuel cells require flows of a fuel, an oxidant, and a coolant, this typically requires at least three pairs of ports or six ports in total. This is because it is necessary for the fuel and the oxidant to flow through each fuel cell. A continuous flow is required as it ensures that although most of the fuel or oxidant may be consumed, any contaminants are continually flushed through the fuel cell.

The foregoing assumes that the fuel cell is a compact type of configuration provided with water or the like as a coolant. There are also known stack configurations which use air as a coolant, either relying on natural convection or forced convection. Such fuel cell stacks typically provide open channels through the stacks for the coolant, and therefore the sealing requirements are diminished. Commonly, it is then only necessary to provide sealed supply channels for the oxidant and the fuel.

Consequently, each flow field plate typically has three apertures at each end, and each aperture represents either an inlet or outlet for one of the fuel, oxidant, or coolant. In a completed fuel cell stack, these apertures align to form distribution channels extending through the entire fuel cell stack. It should therefore be appreciated that the sealing requirements are complex and difficult to meet. However, it is possible to have multiple inlets and outlets to the fuel cell for each fluid, depending on the stack/cell design. For example, some fuel cells have two inlet ports for each of the anode, cathode, and coolant, two outlet ports for the coolant, and a single outlet port for each of the cathode and anode. However, other combinations are also possible.

The coolant most commonly flows across the back of each fuel cell so as to flow between adjacent individual fuel cells. This is not essential, however, and as a result, many fuel cell stack designs have cooling channels only at every second, third, or fourth plate. This allows for a more compact stack with thinner plates but such an arrangement may provide less than satisfactory cooling. It also requires another seal between each adjacent pair of individual fuel cells. Thus, in a completed fuel cell stack, each individual fuel cell requires two seals just to seal the membrane exchange assembly to the two flow field plates. A fuel cell stack with 30 individual fuel cells will require 60 seals for that purpose. Additionally, as noted, a seal is required between each adjacent pair of fuel cells and end seals for the current collectors. For a 30 cell stack, therefore, this requires an additional 31 seals, Thus, a 30 cell stack requires a total of 91 seals, excluding the seals for bus bars, current collectors, and endplates, and each of these would be of a complex and more elaborate construction. With additional gaskets required for bus bars, insulator plates, and endplates, the number easily reaches 100 seals of varying configurations in a single 30 cell stack.

These seals can be formed by providing channels or grooves in the flow field plates, and then providing prefabricated gaskets in the channels or grooves to effect a seal. In known configurations, the gaskets and/or the sealing material are specifically polymerized and formulated to resist degradation from contact with various of the materials of construction in the fuel cell, and the various gases and coolants which are aqueous, organic, and inorganic fluids used for heat transfer. This means that assembly technique for a fuel cell stack will be complex, time consuming, and offers many opportunities for error.

Accordingly, in a first technique, a resilient seal can be provided as a floppy gasket seal molded separately from individual elements of the fuel cells by known methods such as injection, transfer or compression molding of an elastomer.

A second technique for providing such resilient seals involves application of an uncured sealing material to the fuel cell plates by dispensing the uncured sealing material, silk screening the uncured sealing material, or spraying uncured sealing material onto the fuel cell plate to a predetermined thickness, and then curing the sealing material to achieve desired elastomeric properties.

A third technique for providing resilient seals involves insert injection molding in which a resilient seal is fabricated on a plate and assembly of the unit is simplified. According to this technique, the gasket is adhered to the fuel cell plate sufficiently to allow its handling and assembly in the fuel cell stack. Such insert injection molded gaskets can be designed with improved groove and seal profiles to optimize the various sealing forces occurring within a fuel cell stack. The basic process for insert injection molding is known in the art, and reference may be had, for example, to U.S. Pat. No. 4,865,793 (September 1989). As noted hereinafter, this is the most preferred technique according to the present invention.

As an additional consideration, formation or manufacture of such seals or gaskets is complex, and there are generally only two known methods of manufacture. For the first technique, the individual floppy gasket seal can be formed by molding it in a suitable mold. This can be relatively complex and expensive, and for each fuel cell configuration, it would require the design and manufacture of a mold corresponding exactly to the shape of the associated grooves in the flow field plates. This does, however, have the advantage that the designer has freedom in choosing the cross-section of each gasket or seal, and it does not have to have a uniform thickness.

Another method would be to cut each gasket from a solid sheet of material. This has the advantage that a cheaper and simpler technique can be used in which it is only necessary to define the shape of the gasket in a plan view, and to manufacture a cutting tool of that configuration. The gasket can then be cut from a sheet of appropriate material of appropriate thickness. The disadvantage is that one can only form gaskets having uniform thickness. Additionally, it leads to considerable waste of materials. For example, for each gasket, a portion of the material corresponding to the area of a flow field plate is used yet the surface area of the seal itself is only a small fraction of the area of the flow field plate.

Fuel cell stacks after assembly are clamped to secure the elements and ensure that adequate compression is applied to the seals and active area of the fuel cell stack. This ensures that the contact resistance is minimized and the electrical resistance of the individual fuel cells are at a minimum. To this end, fuel cell stacks typically have two end plates which are configured to be sufficiently rigid so that their deflection under pressure is within an acceptable tolerance. The fuel cell also has current bus bars to collect and concentrate current from the fuel cell to a small pick up point, where the current is then transferred to the load via conductors. Insulation plates are also used to isolate thermally and electrically the current bus bars and the endplates from one another. A plurality of elongated rods, bolts and the like, are then provided between the pairs of plates so that the fuel cell stack can be clamped together between the plates by tension rods. Rivets, straps, piano wire, metal plates and other mechanisms can also be used in clamping stacks together.

To assemble the stack, the tension rods extend through one of the plates and an insulator plate, bus bars including seals are placed on top of the endplate, and the individual elements of the fuel cell are built up within the space defined by the rods or some other positioning tool. For each fuel cell, this operation requires the steps of (a) placing a seal to separate the fuel cell from the preceding fuel cell; (b) locating a flow field plate on the seal; (c) locating a seal on the first flow field plate; (d) placing a GDM within the seal on the flow field plate; (e) locating a membrane electrode assembly (MEA) on the seal; (f) placing an additional GDM on top of the MEA; (g) preparing a further flow field plate with a seal and placing this arrangement on top of the membrane exchange assembly while at the same time ensuring that the seal of the second plate falls around the second GDM; (h) with the second or upper flow field plate then having a groove for receiving a seal as in step (a). The process is completed when the last fuel cell is formed, wherein it is then topped off with a bus bar, insulator plate, and the final end plate.

In view of the above, it can be appreciated that each seal has to be carefully placed, and the installer has to ensure that each seal is fully and properly engaged in its sealing groove. It is not uncommon for installers to overlook small portions of seals that may not be properly located. Thus, the seal between adjacent pairs of fuel cells used for the coolant area may have a groove provided in the facing surfaces of the two flow field plates. Necessarily, installers can typically only locate the seal in one of these grooves, and must rely on feel or the like to ensure that the seal properly engages in the groove of the other plate during assembly. In this regard, it is practically impossible for an installer to visually inspect the seal to ensure that it is properly seated in both grooves.

It is possible to mold the seals directly onto the individual cells, as noted above, and this offers advantages during assembly compared to the use of a floppy gasket seal, such as better tolerance and improved part allocation, and can be further improved by techniques according to the present invention.

Thus, it will be appreciated that assembling a conventional fuel cell stack is difficult, time consuming, and can often lead to seal failure. After a complete fuel cell stack has been assembled, it is of course tested, but this procedure can be difficult and complex. Even if leaks are detected, this may initially present itself simply as inability of the stack to maintain pressure of a particular fluid, and it is often difficult to locate exactly where the leak is occurring particularly when the leak is internal. Nevertheless, the only way to repair the fuel cell stack is to disassemble it entirely and replace the faulty seal. This results in a disruption of the other seals so that the entire stack and all the different seals have to be reassembled, which again makes possible misalignment and failure of any one of the numerous seals in the fuel cell stack.

A further problem with conventional assembly and sealing techniques is that the clamping pressure applied to the entire fuel cell stack is intended to serve two different and distinct functions. These functions are (i) to provide a sufficient pressure to ensure that the seals function as intended, and (ii) to provide a desired pressure or compression to the gas diffusion media which is sandwiched between the MEA and the individual flow field plates. If insufficient pressure is applied to the GDM, then poor electrical contact is made; while on the other hand, if the GDM is over compressed, the flow of gas can be compromised.

Unfortunately, in many conventional designs, it is only possible to apply a known total pressure to the overall fuel cell stack. Thus, there is no way of knowing how this pressure is divided between pressure applied to the seals and pressure applied to the GDM. In an otherwise conventional design, this split in applied pressure depends upon design of individual elements in the fuel cell stack, and the maintenance of appropriate tolerances. For example, GDMs commonly lie in center portions of flow field plates, and if the depth of each center portion varies outside an acceptable tolerance, then this results in incorrect pressure being applied to the GDM. The depth can be dependent upon the extent gaskets are compressed which affects their sealing properties, durability, and the lifetime of the seals.

For all these reasons, manufacture and assembly of conventional fuel cells is a time consuming and expensive task, and existing assembly techniques are not suited to any large scale production of a fuel cell on a production line basis. Thus, fuel cell technology is now under development for commercial and residential market application as an alternative power supply worldwide. One area of concern in developing this technology has been the sealing obtained between individual of the fuel cell plates. The materials selected for use in such commercial and residential market applications must meet various manufacturing and functional requirements specific to the applications. Typically, about 2–200 fuel cell plates are being stacked together with silicone rubber seals separating various fuel cell plates, and these fuel cell plates are being constructed of brittle materials which can easily fail due to stress concentrations generated within state of the art groove profiles.

BRIEF SUMMARY OF THE INVENTION

Accordingly, the present invention is directed to circular or elliptical seal groove profiles in fuel cell plates which were developed to minimize stress concentrations in fuel cells and fuel cell stacks, especially for commercial and residential market applications. It has been unexpectedly discovered that these groove profiles enhance the mechanical strength of fuel cell plates over state of the art groove profiles of square or rectangular configuration.

Insert injection molding is the technique used to form the seals in the fuel cell plates. The advantage obtained by using the insert injection molding technique is that the resulting insert injection molded seals can be bonded in the fuel cell plate groove, allowing the remaining seal free surface to be of any shape dependent upon the specific sealing market application. Thus, insert injection molded gasket seals can be bonded in the circular or elliptical groove profile, enabling easier fuel cell plate handling and faster fuel cell stack assembly. The combination of an improved groove profile, and the use of a bonded silicone rubber seal, is considered as providing a significant improvement in fuel cell plate and fuel cell stack design.

In accordance with one aspect of the invention, there is provided a fuel cell assembly comprising (i) a plurality of separate elements; (ii) grooves or a network of grooves extended throughout the fuel cell assembly; and (iii) a seal or gasket within each groove formed by insert injection molding, and wherein the seal and the corresponding groove have profiles of a particular shape such as to provide better sealing between two or more of the separate elements used to define chambers containing fluids used in operating fuel cells and fuel cell stacks. Seal compositions used for forming the seal or gaskets according to the invention are set forth in detail below. These seal compositions are suitable for use at temperatures in the range of −55 to 250° C. For purposes of the present invention, seals formed in a fuel cell or other electrochemical cell are referred to as being a unitary seal construction.

The composition of the sealing material used for forming the seal preferably comprises a linear polysiloxane polymer with either terminal or pendant unsaturated organic groups such as the vinyl group —CH=CH$_2$. The polysiloxane can be a polydimethylsiloxane homopolymer, a polymethyltrifluoropropylsiloxane homopolymer, a polydimethyl (methyltrifluoropropyl)siloxane copolymer, or a mixture thereof. The content of methyltrifluoropropyl can be adjusted to provide increased robustness and chemical resistance when mild or aggressive hydrocarbon based coolants are used in operating the fuel cell. The composition may contain other additives dependent upon the specific polymer composition, such as extending fillers, cure systems of platinum silicon hydrides or peroxides, thermal and acid scavengers such as metal oxides or metal hydroxides, as well as adhesion promoters which can be added to meet any of the unique requirements of a fuel cell construction and their requirements for an operation with a long life.

Fuel cells and fuel cell stacks of the present invention provide a number of advantages over conventional fuel cell and fuel cell stack constructions employing separate gaskets. Firstly, the stress in the fuel cell plate and the elastomeric seal is optimized to the point of providing better sealing properties and a longer life. Secondly, the assembly of the fuel cell stack is greatly simplified. Thirdly, tolerance requirements for the grooves for seals can be relaxed considerably, since it is no longer necessary for the seals to correspond to a chosen gasket dimension. Thus, liquid materials used to form the seals can be injected and compensate for a wide range of variations in the profile of the groove and its dimensions.

The use of a liquid sealing material capable of being cured to form an elastomeric sealing material allows the use of compositions designed to chemically bond to various materials used in the construction of fuel cell plates and the other elements of fuel cell stacks, and this ensures and enhances the performance of the seals. It should also increase the overall durability of fuel cell stacks. When it is anticipated that the fuel cell stack design will include the use of an aggressive coolant such as a glycol, with the present invention, it is a simple matter to select a sealing material that is compatible with the particular coolant or other fluids present.

A related advantage is that a more economic construction can be provided. Thus, as noted, it is not necessary for the grooves to be formed to an accurate dimension. Additionally, there is no waste of the gasket material as commonly occurs when cutting gaskets from a sheet material.

Another aspect of the present invention is the provision of a liquid sealing material containing:
  (a) 100 parts by weight of a polydiorganosiloxane containing two or more silicon bonded alkenyl groups in its molecule;
  (b) 5–50 parts by weight of a reinforcing filler;
  (c) 1–20 parts by weight of an oxide or an hydroxide of an alkaline earth metal with an atomic weight of 40 or more;
  (d) an organohydrogenpolysiloxane containing three or more silicon bonded hydrogen atoms in its molecule, being present in an amount to provide a molar ratio of silicon bonded hydrogen atoms in the organohydrogenpolysiloxane to silicon bonded alkenyl groups in polydiorganosiloxane (a) of 0.4:1 to 5:1;
  (e) a platinum metal type catalyst being present in an amount to provide 0.1–500 parts by weight of platinum metal per one million parts by weight of polydiorganosiloxane (a);

(f) optionally, 0.1–5.0 parts by weight of an organic peroxide being present with or without the presence of ingredient (e);

(g) optionally, 0.01–5.0 parts by weight of an inhibitor;

(h) optionally, 0–100 parts by weight of a non-reinforcing extending filler; and (i) optionally, 0.1–5.0 parts by weight of an adhesion promoter.

In addition to being applicable to fuel cells, the present invention is generally applicable to electrochemical cells. These and other features of the invention will become apparent from a consideration of the detailed description.

BRIEF DESCRIPTION OF THE SEVERAL VIEWS OF THE DRAWING

For a better understanding of the invention and to show more clearly how it may be carried into effect, reference can be made to the accompanying drawings showing preferred embodiments of the present invention.

FIGS. 3a–3d are cross sectional views of a portion of a fuel cell plate having various designs of groove profiles which can be used in constructing fuel cell plates of the types depicted in FIGS. 1 and 2. While FIGS. 3a–3d each show a seal design with a pair of upstanding beads 11, it should be apparent that one to three or more of such beads may be present.

In particular.

DETAILED DESCRIPTION OF THE INVENTION

Figure 1:
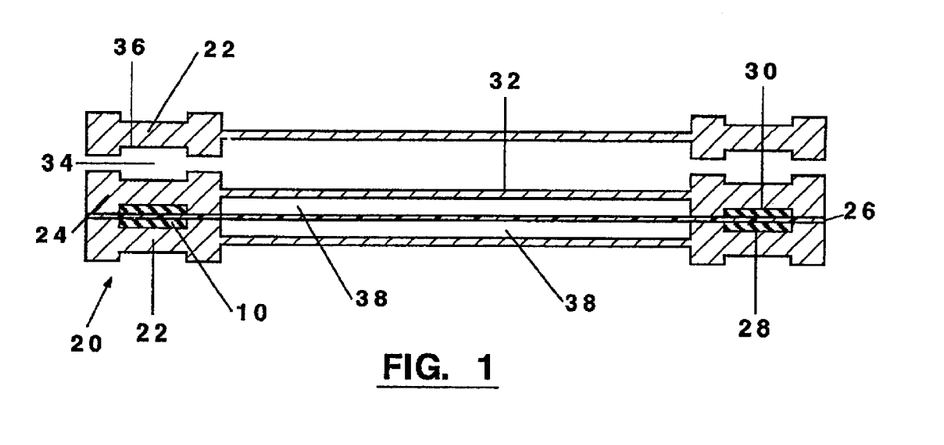
FIG. 1 is a pictorial representation in cross section through part of a fuel cell stack in accordance with a first embodiment of the invention.
Figure 2:
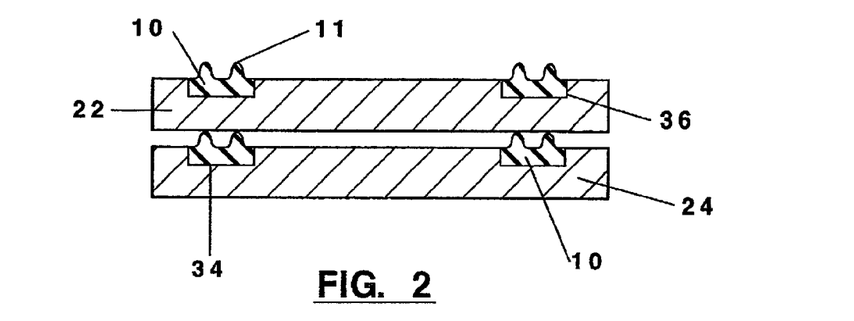
FIG. 2 is another pictorial representation in cross section through part of a fuel cell stack in accordance with a second embodiment of the invention.

A first embodiment of apparatus 20 is shown in FIG. 1. For simplicity, FIG. 1 shows only part of a fuel cell stack, as does a second embodiment in FIG. 2. It should be understood that other fuel cells would be present in the stack and would correspond in general design as the ones shown, and that the fuel cell stack would include end elements and clamping elements required to provide an operative unit. FIGS. 1–3 are intended to indicate only essential elements of individual embodiments of the invention, and it should be understood that an operative fuel cell stacks would otherwise correspond to the structures shown in FIGS. 4–6. FIGS. 1 and 2, the membrane electrode assembly 26 is shown for clarity with an exaggerated thickness, whereas in actuality, it has a very small thickness. In FIGS. 1–3, the grooves for the sealing material are shown schematically and have depths and widths that are similar.

The first embodiment 20 shows a fuel cell including an anode bipolar plate 22, and a cathode bipolar plate 24. Sandwiched between the bipolar plates 22 and 24 is a membrane electrode assembly (MEA) 26. In order to seal MEA 26, each of the bipolar plates 22 and 24 is provided with a respective groove 28 and 30. This is a departure from conventional practice, as it is common to provide the flow plates with channels for gases, but with no recess for a gas diffusion media (GDM) or the like. Most commonly, the thickness of the seals projecting above the flow plates provides sufficient space to accommodate a GDM. In FIG. 1, however, the flow plates are intended to directly abut one another, thereby providing a much better control on the space provided for a complete MEA 26, and hence the pressure applied to the GDM. This ensures better and more uniform performance from GDMs.

The MEA comprises three layers, namely (i) a central proton exchange membrane layer (PEM), and (ii) a layer of a finely divided catalyst on both sides of the PEM to promote reaction necessary on either side of the PEM. There are also two layers of gas diffusion media (GDM) located on either side of the PEM abutting the catalyst layers, and pressed against the catalyst layers to ensure adequate electrical conductivity, but the two layers of GDM are not considered to be part of the MEA itself.

Cathode bipolar plate 24 has a rear face that faces the rear face of the other anode bipolar plate 22 of the adjacent fuel cell and defines a coolant channel 32. To seal the cathode bipolar plate 24 and the upper anode bipolar plate 22, grooves 34 and 36 are provided. The anode and cathode bipolar plates 22 and 24 define a chamber or cavity for receiving MEA 26 and for the gas distribution media (GDM) located on either side of the MEA. The chambers or cavities for the GDM are shown at 38.

For each pair of grooves 28 and 30, and 34 and 36 a gasket is provided, and the grooves are the locus for receiving the sealing material which is injected into the grooves and cured by subjecting it to a suitable elevated temperature, to form the complete seal or gasket. This does not require a preformed or floppy gasket and is referred to herein as a unitary seal construction. The final seal according to the present invention has preferred shapes and is able to flow and fill imperfections, thereby allowing for variations in tolerances in various of the components.

It will be appreciated that FIGS. 1–3 show only the basic principle behind the invention, and do not show other elements which would be essential for a complete fuel cell stack. For example, FIG. 1 does not show all of the other structure for providing the flow of gases and coolant to individual ones of the fuel cells. However, the sealing technique depicted in FIGS. 1–3 is intended as being incorporated in embodiments shown in FIGS. 4–6.

FIG. 2 is similar to FIG. 1 but shows an alternate embodiment in which the fuel cell plate 22 contains grooves 34 and 36 on only a single side of plate 22. Otherwise, this embodiment is the same as the embodiment depicted in FIG. 1. Thus, each groove 34 and 36 has a groove profile for accommodating gasket 10, however, in FIG. 2, gasket 10 has a pair of upstanding beads 11. A single upstanding bead 11 or three or more upstanding beads 11 can also be used for providing better sealing function of gasket 10 against opposing surfaces.

Figure 3A:
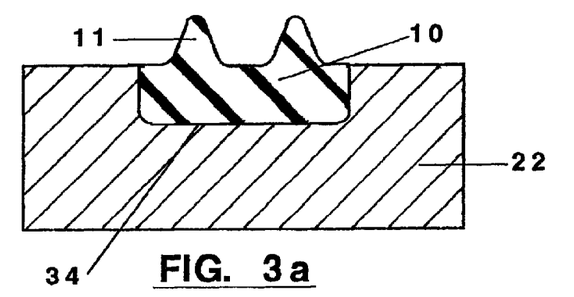
FIG. 3a depicts a fuel cell plate structure including a sealing material in a groove with a square profile having a radius of 0.005 inches.
Figure 3B:
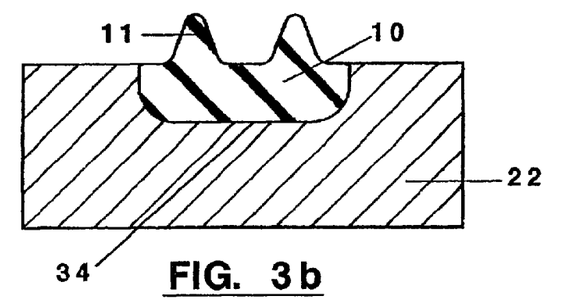
FIG. 3b depicts a fuel cell plate structure including a sealing material in a groove with a square profile having a radius of 0.030 inches.
Figure 3C:
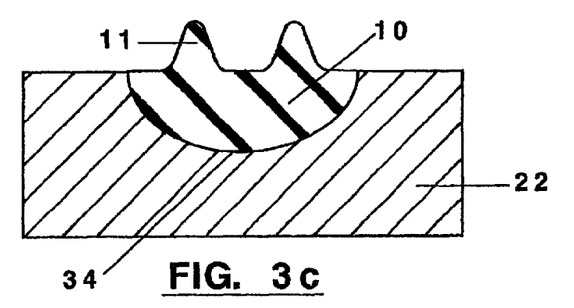
FIG. 3c depicts a fuel cell plate structure including a sealing material in a groove with a circular profile.
Figure 3D:
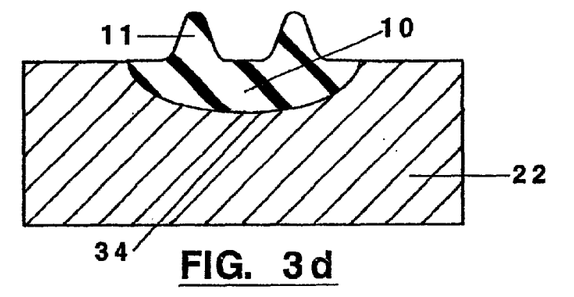
FIG. 3d depicts a fuel cell plate structure including a sealing material in a groove with an ellipse profile.

FIGS. 3a to 3d each represent a portion of fuel cell plate 22 in which groove 34 is depicted as having a different profile of a particular shape for accommodating beaded gasket 10. Thus, in FIG. 3a, the sealing material is in a groove with a profile that is square on a radius of 0.005 inches. In FIG. 3b, the sealing material is in a groove with a profile that is square on a radius of 0.030 inches. In FIG. 3c, the sealing material is in a groove with a profile that is circular. In FIG. 3d, the sealing material is in a groove with a profile that is an ellipse. The preferred profiles are depicted in FIGS. 3c and 3d.

Insert injection molding is the preferred technique for making unitary seal types of fuel cell plates 22. As previously noted, the process for insert injection molding is known in the art, and reference may be had to U.S. Pat. No. 4,865,793 (September 1989). In the insert injection molding process, an insert, i.e., a fuel cell plate 22 containing uncured sealing material, is placed or inserted into one side of a mold cavity, and brought into contact with another side or half of the mold of cavity having a shape conforming to the desired shape of the outer surface of the sealing material. During the insert injection molding process, the uncured sealing material is caused to flow and fill the grooves, and in the process the sealing material is cured. The mold halves are then separated and the finished fuel cell plate 22 is removed from the mold.

Prior to assembling a fuel cell stack, it may be necessary to clean the surfaces of the various elements, and in some instances to apply a primer. Cleaning can be carried out by applying acetone to the surfaces to be cleaned, followed by application of isopropyl alcohol, in which the surfaces are wiped down between the two cleaning treatments.

A primer may be necessary where the sealing material does not form an adequate bond for sealing to any of the different materials used in fuel cells. For example, some materials typically used in constructing fuel cells include titanium, stainless steel, gold, graphite, composite graphite, ABS (acrylonitrile butadiene styrene), polycarbonate, polysulfone, thermoplastics and thermal set plastics, aluminum, Teflon®, and high density polyethylene. The primer can be applied by brushing, rolling, spray application, or screen transfer as a liquid composition, optionally with a solvent carrier that evaporates, or the primer can be plated or dip coated onto the appropriate surface. Alternatively, the carrier can be incorporated into the material used to make a particular component so that the surface properties of the component or element are altered and form a good bond with the material used for forming the seal. In a further embodiment, the primer can be added directly to the sealing material prior to using it to form the seals in the fuel cell stack.

Some representative examples of suitable primers for use herein comprise the dilute solutions of various reactive silanes and/or siloxanes in solvents as described in U.S. Pat. No. 3,377,309 (Apr. 9, 1968), U.S. Pat. No. 3,677,998 (Jul. 18, 1972), U.S. Pat. No. 3,794,556 (Feb. 26, 1974), U.S. Pat. No. 3,960,800 (Jun. 1, 1976), U.S. Pat. No. 4,269,991 (May 26, 1981), U.S. Pat. No. 4,719,262 (Jan. 1, 1988), and U.S. Pat. No. 5,973,067 (Oct. 26, 1999), the contents of which are incorporated by reference. One primer, for example, is described in the '998 patent as being a mixture of an organotitanate, tetra(methoxy ethoxy) silane, a methylsiloxane resin, acetic acid or an organotriacetoxysilane, in a hydrocarbon solvent such as naphtha.

To cure the sealing material during application of the unitary seal, a curing temperature can be determined by selecting certain components for the sealing material. Curing temperatures typically are 30° C. to 200° C., and the curing temperature must be compatible with the materials of the fuel cell, the fuel cell plate, or other substrates present in the fuel cell stack.

Figure 4:
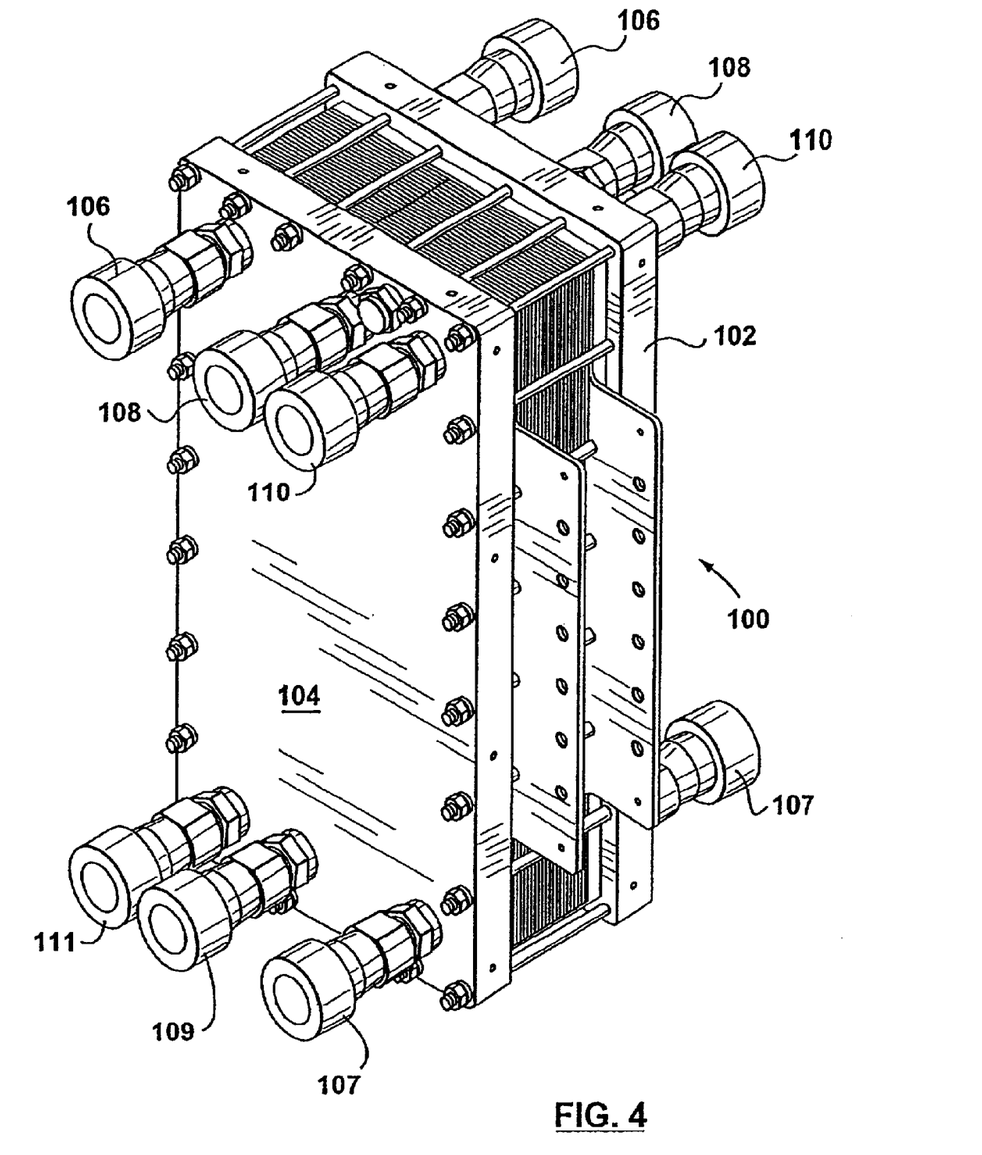
FIG. 4 is an isometric view of a fuel cell stack of the type suitable for use with fuel cell plates having the seals and groove profiles according to the present invention.
Figure 5:
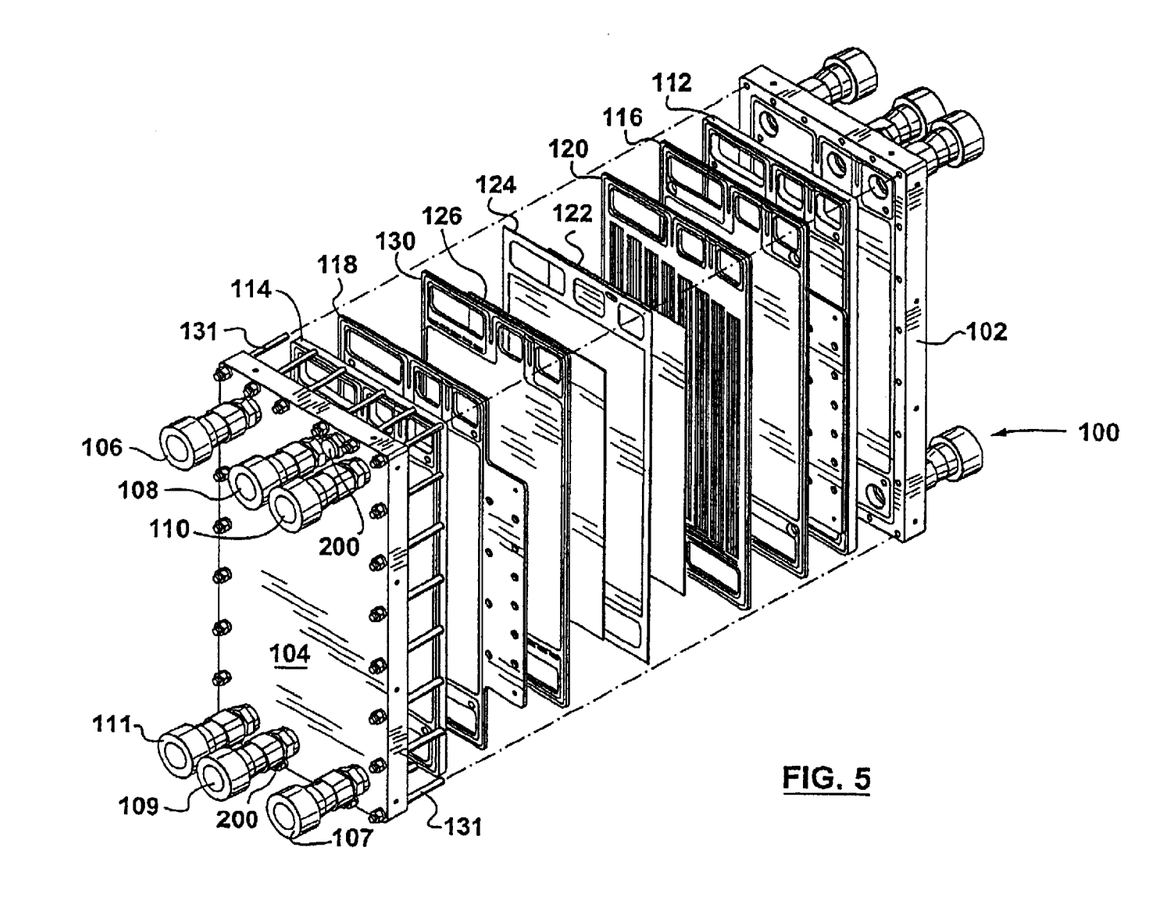
FIG. 5 is an isometric exploded view of the fuel cell stack of FIG. 4 showing its individual components.
Figure 6A:
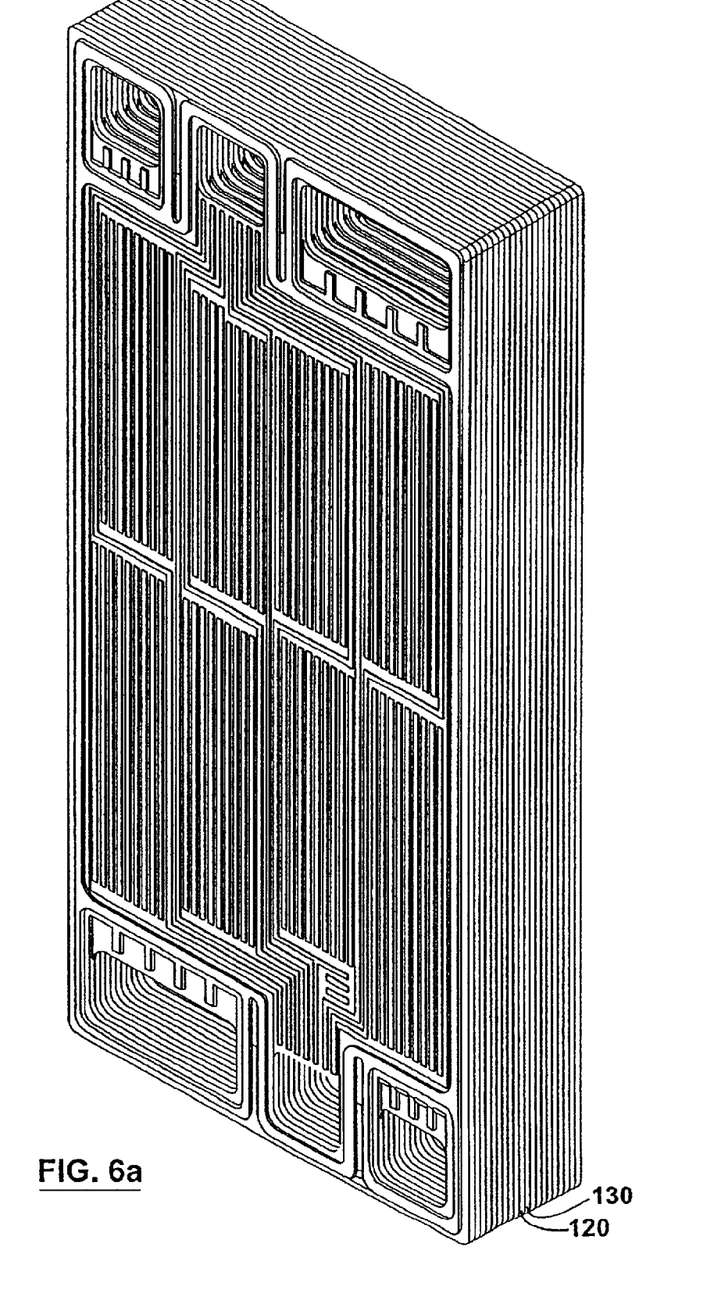
FIGS. 6a and 6b show, respectively, a twenty (20) cell fuel cell stack and an one hundred (100) cell fuel cell stack, each containing fuel cell plates of an appropriate design for accommodating the seals and groove profiles according to the invention.
Figure 6B:
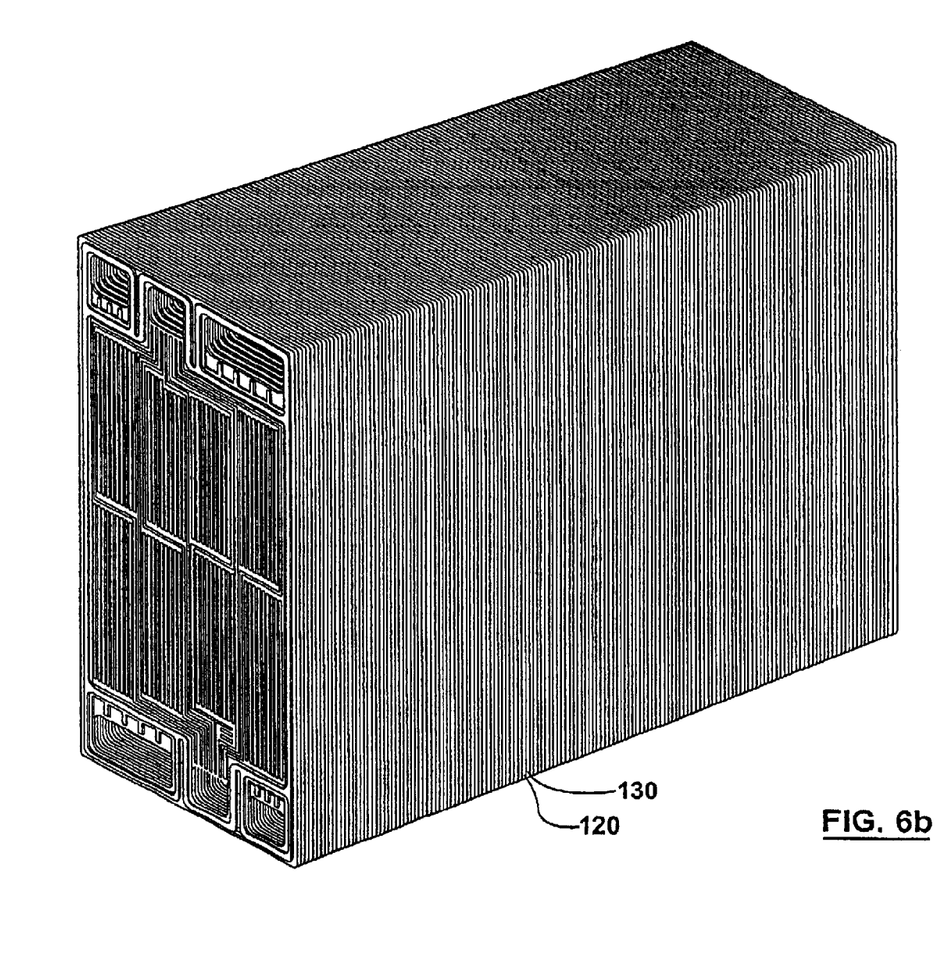

Reference will now be made to FIGS. 4–6 which show a fuel cell stack 100 containing the basic elements of the fuel cell stack 100. Thus, fuel cell stack 100 includes an anode endplate 102 and a cathode endplate 104. The endplates 102 and 104 are each provided with connection ports for the supply of the necessary fluids. Air connection ports 106 and 107, coolant connection ports 108 and 109, and hydrogen connection ports 110 and 111, are also depicted as constituting other of the elements of the fuel cell stack 100. Although not shown, it should be understood that corresponding coolant and hydrogen ports corresponding to ports 109 and 111 are included on the anode side of the fuel cell stack. The various ports 106–111 are in turn connected to distribution channels or ducts that extend throughout the fuel cell stack 100. These ports are provided in pairs, and extend all the way through the fuel cell stack 100 to enable connection of the fuel cell stack 100 to various elements of the other equipment necessary to the operation of a commercial embodiment of a fuel cell. This feature also enables a number of the fuel cell stacks 100 to be connected together.

Immediately adjacent anode and cathode endplates 102 and 104 are insulators 112 and 114. Immediately adjacent the insulators 112 and 114 are an anode current collector 116 and a cathode current collector 118. Between the current collectors 116 and 118 there is a plurality of fuel cells plates, however, in FIG. 5 for the sake of simplicity, only the elements of one fuel cell are shown. Thus, there is shown in FIG. 5 an anode flow field plate 120, a first or anode gas diffusion layer or media 122, an MEA 124, a second or cathode gas diffusion layer 126, and a cathode flow field plate 130. To hold the assembly together, tie rods 131 are screwed into threaded bores in the anode endplate 102 and pass through the corresponding plain bores in the cathode endplate 104. Fasteners are provided for tightening the whole assembly and to ensure that the various elements of the individual fuel cells are clamped together. As such, it should be understood that other elements of a fuel cell stack and assembly can be largely conventional and are not described in detail.

FIGS. 6a and 6b show configurations 20 and 100 individual fuel cells, respectively. FIGS. 6a and 6b show the fuel cells schematically and indicate basic elements of the fuel cells themselves without components necessary at the end of the fuel cell stack. Thus, endplates 102 and 104, insulators 112 and 114, and current collectors 106 and 108, are not shown. Rather, FIGS. 6a and 6b show pairs of flow field plates 120 and 130. In FIG. 5, a closure plug 200 can be provided to limit access to conduits which may be in communication with the system of grooves, if desired.

Following curing and assembly, the fuel cell stack 100 is subjected to a battery of tests to check for desired electrical and fluid properties, and in particular, to check for absence of leaks of any of the fluids flowing through it. If any leaks are detected, the fuel cell will be repaired, and depending on the nature of the leak and the details of an individual fuel cell stack design, it may be possible simply to separate the whole assembly at one seal, clear out the defective seal, and form a new seal. For this reason, it may prove to be desirable to manufacture relatively small fuel cells stacks. While this requires more inter-stack connections, it will be more than compensated for by the inherent robustness or reliability of each individual fuel cell stack. This concept can be applied all the way down to a single fuel cell unit such as the Membrane Electrode Unit (MEU), and this would then allow for fuel cell stacks of any length to be manufactured.

The MEU is preferably formed so that a number of MEUs can be clamped together to form a complete fuel cell stack of any desired capacity. Thus, a typical MEU would simply have flow field plates whose outer or rear faces were adapted to mate with the corresponding faces of other MEUs to provide the necessary functionality. Typically, the faces of the MEU are adapted to form a coolant chamber for cooling the fuel cells. One outer face of the MEU can have a seal or gasket preformed with it, and the other face can be planar or grooved to receive a preformed seal on the other MEU. This outer seal or gasket can be formed as a unitary seal simultaneously with the formation of internal seals. This enables a wide variety of fuel cell stacks to be configured from a single basic unit or MEU. The MEU can comprise a single fuel cell or a smaller number of fuel cells, e.g., five. Therefore, in a completed fuel cell stack 100, replacing a failed MEU would be relatively simple. Reassembly would only require that the proper seals were formed between the adjacent MEUs and that the seals within each MEU were not disrupted by the procedure.

It should be noted that FIG. 1 illustrates an embodiment in which the network of grooves is present in elements or components on both sides of the plates. It will be appreciated that this is not always necessary, as shown in FIG. 2. Thus, for some purposes, e.g., for defining a chamber for coolant, it may be sufficient to provide the grooves in one flow plate with a mating surface being planar so that tolerances will be less critical. The invention has also been described as showing an MEA extending to the edges of the flow field plates. However, the material of an MEA is expensive and so it necessarily must be thin, typically of the order of magnitude of one to two thousands of an inch. Thus, for some applications, it will be preferable to provide a peripheral flange or mounting layer bonded together and overlapping the periphery of the PEM itself. The flange can then be formed from two layers, each being one to two thousands of an inch thick, for a total thickness of two to four thousands of an inch. This is flange or layer sealed with the seal.

While the invention has been described in terms of a proton exchange membrane (PEM) fuel cell, it should be appreciated that the invention is applicable to any type of fuel cell. Thus, the concepts of the invention can be applied to fuel cells with alkali electrolytes, fuel cells with phosphoric acid electrolytes, high temperature fuel cells, e.g. fuel cells with a membrane similar to a proton exchange membrane but adapted to operate at around 200° C., electrolyzers, regenerative fuel cells and other electrochemical cells. The concepts can also be used with higher temperature fuel cells such as molten carbonate and solid oxide fuels provided the sealing material is suitable under such conditions.

Elastomeric sealing materials for use according to this invention are organosiloxane compositions curable to an elastomeric state, and having a pumpable viscosity in their uncured state to allow the compositions to be cured in situ in a fuel cell cavity, providing the various seals in distinct zones, as detailed above. These elastomeric sealing material compositions preferably contain:

(a) 100 parts by weight of a polydiorganosiloxane containing two or more silicon atom bonded alkenyl groups in its molecule;

(b) 5–50 parts by weight of a reinforcing filler;

(c) 1–20 parts by weight of an oxide or hydroxide of an alkaline earth metal with an atomic weight of 40 or more;

(d) an organohydrogensiloxane containing three or more silicon atom bonded hydrogen atoms in its molecule, the organohydrogensiloxane being present in an amount to provide a molar ratio of the silicon atom bonded hydrogen atoms in the organohydrogensiloxane to the silicon atom bonded alkenyl groups in the polydiorganosiloxane containing two or more silicon atom bonded alkenyl groups in a range of 0.4:1 to 5:1; and (e) a platinum metal type catalyst being present in an amount such as to provide 0.1–500 parts by weight of platinum metal per one million parts by weight of polydiorganosiloxane (a);

(f) optionally, 0.1–5.0 parts by weight of an organic peroxide, the organic peroxide being present with or without ingredient (e).

(g) optionally, 0.01–5.0 parts by weight of an inhibitor;

(h) optionally, 0–100 parts by weight of a non-reinforcing extending filler; and (i) optionally, 0.1–5.0 parts by weight of an adhesion promoter.

Ingredient A—The Polydiorganosiloxane

The polydiorganosiloxane should have a viscosity within a range of 0.03 to less than 100 Pa-s at 25° C. It can be represented by the formula $X(R^1R^2SiO)_nX$ where $R^1$ and $R^2$ represent identical or different monovalent substituted or unsubstituted hydrocarbon radicals; n is the average number of repeating units in the polymer which can be selected to provide the desired viscosity; and X is a terminal group comprising an ethylenically unsaturated hydrocarbon radical. Thus, when the elastomeric sealing material composition is cured by hydrosilylation with an organohydrogensiloxane or vinyl specific peroxide, X is typically vinyl or another alkenyl radical.

Hydrocarbon groups represented by $R^1$ and $R^2$ include alkyls groups with 1–20 carbons atoms such as methyl, ethyl, and tertiary butyl; alkenyl groups with 1–20 carbon atoms such as vinyl, allyl, and 5-hexenyl; cycloalkyl groups with 3–20 carbon atoms such as cyclopentyl and cyclohexyl; and aromatic hydrocarbon groups such as phenyl, benzyl, and tolyl. $R^1$ and $R^2$ can be substituted with halogen, alkoxy, or cyano groups. Preferred hydrocarbon groups are alkyl groups containing 1–4 four carbon atoms, phenyl, and halogen substituted alkyl groups such as 3,3,3-trifluoropropyl. Most preferably, $R^1$ is the methyl group, $R^2$ is at least one of methyl, phenyl, or a 3,3,3-trifluoropropyl group, and X is a methyl or vinyl group. Optionally, one or more of the $R^2$ groups can be an alkenyl group. Preferred polydiorganosiloxanes are dimethylvinylsiloxy endblocked polydimethylsiloxanes having a viscosity within a range of 0.3 to less than 100 Pa.s.

The polydiorganosiloxane can be a homopolymer, a copolymer or a mixture containing two or more different homopolymers and/or copolymers. When the elastomeric sealing material composition is cured by hydrosilylation, at least a portion of the polydiorganosiloxane can be a copolymer where X represents an alkenyl group, and a portion of $R^2$ groups on non-terminal silicon atoms can optionally comprise an ethylenically unsaturated group such as vinyl or hexenyl.

Methods for preparing such polydiorganosiloxanes are known in the art, such as the acid or base catalyzed polymerization of cyclic polydiorganosiloxanes containing three or four siloxane units per molecule. Another method involves replacing the cyclic polydiorganosiloxane with the corresponding diorganodihalosilane(s) and an acid acceptor. Such polymerizations are conducted under conditions yielding the desired viscosity and molecular weight polymer.

Ingredient B—The Reinforcing Filler

The type of reinforcing silica filler used in the present invention is not critical and it can be any reinforcing silica filler known in the art. Thus, it can be a precipitated or pyrogenic silica with a surface area of at least 50 square meters per gram ($M^2/g$). More preferred are precipitated or pyrogenic silicas having surface areas within the range of 150–500 $M^2/g$. The most preferred reinforcing silica filler is pyrogenic silica with a surface area of 370–420 $M^2/g$. Pyrogenic silica fillers can be produced by burning silanes such as silicon tetrachloride or trichlorosilane as described in U.S. Pat. No. 2,614,906 (October 1952) and U.S. Pat. No. 3,043,660 (July 1962). These fillers can be treated with organosilanes or organopolysiloxanes, if desired. The amount of this ingredient used in the elastomeric sealing material composition will depend upon type of inorganic filler used. Typically, it is present in amounts in the range of 5–50 parts by weight per 100 parts by weight of Ingredient (B).

Ingredient C—The Oxide or Hydroxide of an Alkaline-Earth Metal

The oxide or hydroxide of the alkaline earth metal with atomic weight of 40 or greater is one of the characteristic ingredients of the elastomeric sealing material composition. It is included to ensure that cured products of the elastomeric sealing material composition are not deteriorated by the PEM. Some representative examples of oxides and hydroxides of alkaline earth metals include oxides and hydroxides of calcium, strontium, and barium. These materials can be used alone or as mixture of any two or more. Also, they may be used in the form of fine powders to ensure effective dispersion in the elastomeric sealing material composition. Most preferred are calcium hydroxide and calcium oxide. This ingredient is used in the amount of 1–20 parts by weight, preferably 6–12 parts by weight, per 100 parts by weight of Ingredient (A).

Ingredient D—The Organohydrogensiloxane

The organohydrogensiloxane with three or more silicon bonded hydrogen atoms in its molecule functions as the crosslinking agent. Some representative examples of suitable organohydrogensiloxanes that can be used include methylhydrogenpolysiloxanes with each end blocked with trimethylsiloxy groups, dimethylsiloxane/methyl hydrogensiloxane copolymers with each end blocked with trimethylsiloxy groups, methylphenylsiloxane/methyl hydrogensiloxane copolymers with each end blocked with dimethylphenylsiloxy groups, cyclic methylhydrogenpolysiloxanes, and copolymers made with dimethylhydrogensiloxy units and $SiO_{4/2}$ units. Fluorosilicone crosslinking agents such as methyltrifluoropropyl methyl hydrogen siloxane copolymers with each end blocked with dimethyl hydrogen groups can also be used, particularly those containing greater than 50 mole percent of methyltrifluoropropyl. The organohydrogensiloxane should be present in the elastomeric sealing material composition in an amount to ensure that the molar ratio of silicon bonded hydrogen atoms in it to the silicon bonded alkenyl groups in Ingredient (A) is in the range of 0.4:1 to 5:1, otherwise it is difficult to obtain good curing properties.

Ingredient E—The Platinum Group VIII Catalyst

Platinum catalysts are the most preferred catalysts for curing the elastomeric sealing material composition. Representative suitable catalysts include fine platinum powder, platinum black, chloroplatinic acid, platinum tetrachloride, olefin complexes of chloroplatinic acid, alcohol solutions of chloroplatinic acid, complexes of chloroplatinic acid and alkenylsiloxanes. Catalysts containing other Group VII metals such as rhodium or palladium instead of platinum can also be employed. The amount of the platinum catalyst should be sufficient to provide 0.1–500 parts by weight of platinum metal atoms per one million parts by weight of Ingredient (A). If the amount is less than 0.1 part, the curing reaction may not proceed to completion, whereas if the amount is more than 500 parts, it is not cost effective.

Ingredient (E) can be used in the form of a spherically shaped fine grain catalyst made with a thermoplastic resin containing 0.01 weight percent or more of platinum metal atoms. However, to ensure that these types of platinum catalyst disperse quickly into the elastomeric sealing material composition at the molding temperature, the softening point of the thermoplastic resin should be in the range of 50–150° C. In addition, the average grain size of the spherically shaped fine grain catalyst should be in the range of 0.01–10 micron. Some examples of suitable encapsulated catalysts are described in U.S. Pat. Nos. 4,766,176 (Aug. 23, 1988); U.S. Pat. No. 4,784,879 (Nov. 15, 1988); U.S. Pat. No. 4,874,667 (Oct. 17, 1989; and U.S. Pat. No. 5,077,249 (Dec. 31, 1991), the contents of which are incorporated by reference.

Ingredient F—The Organic Peroxide Curing Agent

Ingredient F is an organic peroxide curing agent which aids in forming the cured silicone elastomer. Preferably, the organic peroxide is vinyl specific, which requires the presence of the vinyl group or other ethylenically unsaturated hydrocarbon substituent in the polydiorganosiloxane. Vinyl specific peroxides which are useful as curing agents in the curable elastomeric sealing material composition include alkyl peroxides such as 2,5-bis(t-butylperoxy)-2,3-dimethylhexane. The organic peroxide can also be of the type referred to as nonvinyl specific, which react with any type of hydrocarbon radical to generate free radicals.

Optional Ingredient G—The Inhibitor

Inhibitors can be present so that the elastomeric sealing material composition has a suitable working life to allow for its processing as may be necessary. They are exemplified by alkyne alcohols such as 3,5-dimethyl-1-hexyn-3-ol, 1-ethynyl-1-cyclohexanol, and phenylbutynol; ene-yne compounds such as 3-methyl-3-penten-1-yne and 3,5-dimethyl-3-hexen-1-yne; tetramethyltetrahexenyl cyclotetrasiloxane; and benzotriazole.

Optional Ingredient H—The Non-Reinforcing Extending Filler

Some preferred non-reinforcing extending fillers include quartz powder, diatomaceous earth, iron oxide, aluminum oxide, calcium carbonate, or magnesium carbonate.

Optional Ingredient I—The Adhesion Promoter

Some adhesion promoters suitable for use herein are described in U.S. Pat. Nos. 4,082,726 (Apr. 4, 1978), U.S. Pat. No. 4,087,585 (May 2, 1978), U.S. Pat. No. 4,732,932 (Mar. 22,1988), U.S. Pat. No. 5,789,084 (Aug. 4,1998), and U.S. Pat. No. 6,124,407 (Sep. 26, 2000). Such adhesion promoters generally comprise organosilicon compounds such as silanes and siloxanes containing one or more epoxy groups. Compositions of this type are typically used in amounts of 0.1–20 parts by weight, preferably 0.1–5.0 parts by weight, of the adhesion promoter based on the weight of the elastomeric sealing material composition. The adhesion promoter is generally added to the elastomeric sealing material composition before it is cured.

Other optional additives can also be present in the elastomeric sealing material composition including heat resistant agents, flame retarding agents, and pigments. As noted above, there can also be included various combinations of extending fillers, cure systems such as platinum silicon hydrides and peroxides, thermal and acid scavengers such as metal oxides or hydroxides, any of which can be added to the elastomeric sealing material composition to meet any unique requirements of fuel cell constructions and their operating requirements for insuring long life of operations.

Elastomeric sealing material compositions of this invention can be easily manufactured by uniformly blending the various requisite and optional ingredients. Blending can be performed by means of kneader mixers, pressurized kneader mixers, Ross™ mixers, or other blending device. The elastomeric sealing material composition can also be prepared as two or more liquids which are blended immediately before their use to facilitate manufacturing and to improve workability.

EXAMPLES

The following examples are set forth in order to illustrate the invention in more detail. In particular, details of the elastomeric sealing material composition are shown in the accompanying examples. In the examples, parts refers to parts by weight, and viscosity refers to values at 25° C. In Tables IV and VII to IX, the tests were based on the referenced ASTM Method.

Example 1

TABLE I

| Composition of Silicone Base Material | |
|---|---|
| Parts | Ingredient |
| 100 | Dimethylvinylsiloxy Terminated Dimethylpolysiloxane |
| 40 | Quartz |
| 40 | Amorphous Fumed Silica |
| 13 | Hexamethyldisilazane |
| 0.4 | Tetramethyldivinyldisilazane |
| 3 | Hydroxy Terminated Dimethylpolysiloxane |

100 parts of a dimethylvinylsiloxy terminated polydimethylsiloxane having a viscosity of 55,000 cp; 3 parts of an hydroxy terminated dimethylsiloxane having a viscosity of 41 cp; 40 parts of quartz silica with an average particle size of 5 $\mu$; and 40 parts of fumed silica with an average surface area of 400 m²/g surface treated with 13 parts of hexamethyldisilazane and 0.4 parts of tetramethyldivinyidisilazane; were blended until homogeneous. After blending, the material was heat treated under vacuum to remove ammonia and any trace volatiles. This composition forms the base material referred to and used in the accompanying examples, i.e., Tables II and III. It is a shelf stable paste that is flowable and that can be extruded through an ⅛" orifice at a of 30 g/min under 90 psig pressure.

TABLE II

| Composition of Silicone Material A | |
|---|---|
| Parts | Ingredients |
| 100 | Silicone Base Material |
| 56 | Dimethylvinylsiloxy Terminated Dimethylpolysiloxane |

TABLE II-continued

| Composition of Silicone Material A | |
|---|---|
| Parts | Ingredients |
| 34 | Dimethylvinylsiloxy Terminated Dimethyl Methylvinylpolysiloxane Copolymer |
| 12 | Calcium Hydroxide |
| 0.7 | 1,3-Diethenyl-1,1,3,3-Tetramethyldisiloxane Platinum Complex |

100 parts of the silicone base material prepared above and shown in Table 1; 56 parts of a dimethylvinylsiloxy terminated dimethylpolysiloxane having a viscosity of 55,000 cp; 34 parts of a dimethylvinylsiloxy terminated dimethylmethylvinylpolysiloxane having a viscosity of 350 cp; 12 parts of 99 percent pure calcium hydroxide with a sulfur content less then 0.1 percent; and 0.7 parts of a 1,3-diethenyl-1,1,3,3-tetramethyidisiloxane platinum complex containing an amount of platinum metal atoms equaling 0.52 weight percent; were blended until homogeneous. The material was a flowable liquid with a viscosity of 128,000 cp at 23° C.

TABLE III

| Composition of Silicone Material B | |
|---|---|
| Parts | Ingredients |
| 100 | Silicone Base Material |
| 55 | Dimethylvinylsiloxy Terminated Dimethylpolysiloxane |
| 34 | Dimethylvinylsiloxy Terminated Dimethyl Methylvinylpolysiloxane Copolymer |
| 5 | Dimethylhydrogensiloxy Modified Polysiloxane Resin |
| 0.2 | 1-Ethynyl-1-Cyclohexanol |

100 parts of the silicone base material referred to above in Tables I–III; 55 parts of a dimethylvinylsiloxy terminated dimethylpolysiloxane having a viscosity of 55,000 cp; 34 parts of a dimethylvinylsiloxy terminated dimethylmethylvinylpolysiloxane having a viscosity of 350 cp; 5 parts of a dimethylhydrogensiloxy modified siloxane resin containing 0.96 weight percent of silicon atom bonded hydrogen, and having a viscosity of 25 cp; and 0.2 parts of 99 percent pure 1-ethynyl-1-cyclohexanol as an inhibitor; were blended until homogeneous. The material was a flowable liquid with a viscosity of 84,000 cp. Compositions A and B were mixed in a 50:50 ratio, press molded at 150° C. for 5 minutes, and exhibited the characteristics shown in Table IV.

TABLE IV

| Results of Test of Cured Elastomer | | |
|---|---|---|
| Property | ASTM Method | Result |
| Durometer (Shore A) | ASTM D2240 | 43 |
| Tensile, at Break (psi) | ASTM 412 | 655 |
| Elongation at Break (percent) | ASTM 412 | 235 |
| Tear, Die B (ppi) | ASTM 625 | 25 |
| Modulus, at 100 percent (psi) | ASTM 412 | 248 |

Elastomeric sealing material compositions used as gasket materials for fuel cells must be resistant to degradation when in contact with fuel cell components and fluids. Of specific importance is the resistance to the PEM operating environment, and the resistance to swell in various liquids that may be used as coolants or reactant gases. Several methods can be used to determine resistance to PEM operating environments. For example, sheets of a prospective sealing material can be were placed in contact with sheets of the PEM material, rolled tightly, and held in position with an appropriate banding. The rolls are then placed in acidic fluids and heated deionized (DI) water to provide an accelerated aging test. The test is completed with DI water heated to 100° C. Using this test, it was determined that elastomeric sealing material compositions according to the present invention did not harden or crack after eight months of exposure under such conditions.

An additional requirement is that sealing materials not swell excessively when in contact with coolants used in the fuel cell. Standard methods for determining volume swell at ambient or elevated temperatures were completed for elastomeric sealing material compositions according to the present invention; and a volume swell of less than one percent measured at 82° C. for 72 hours, was observed for the compositions, in DI water, ethylene glycol/water solutions, and propylene glycol/water solutions.

After having prepared various plates and components of a fuel cell stack by insert injection molding, a stack of fuel cell elements was assembled, using the following procedure in which reference may be had to the fuel cell stack depicted in FIG. 5.

1. An anode end plate 102 was placed flat on a horizontal surface with its seal facing upwardly.
2. An insulator plate 112 was placed on the anode end plate while locating the plate in a position so that each plate aligned with one another.
3. An anode bus bar plate 116 was placed on the insulator plate while locating the plate so that each plate aligned with one another.
4. An anode bipolar flow field plate 120 was placed on the insulator plate with the active area facing upwardly while aligning the seal of each plate.
5. A GDL layer 122 was cut to fit in recessed surface active areas and placed on the anode bipolar flow field plate.
6. A PEM layer 124 was placed on the anode bipolar flow field plate and the GDL.
7. A GDL layer 126 was cut to fit in recessed surface active areas and placed on the cathode bipolar flow field plate.
8. A cathode bipolar flow field plate 130 was placed on the assembly with the active area facing downwardly.
9. A cathode bus bar plate 118 was placed on the assembly while locating the plate so that the seal was aligned.
10. An insulator plate 114 was placed on the assembly while locating the plate so that the seal on each plate aligned with one another.
11. The cathode end plate 104 was placed flat on a horizontal surface with the seal groove segments facing downwardly.
12. Perimeter bolt type tie rods 131 were inserted through the cathode end plate 104 to extend to screw into the anode end plate 102.
13. The perimeter bolts 131 were tightened to provide an even distribution of the clamping of the various assembly elements of Steps 1–11.

Example 2

Three additional examples were prepared, and these additional exemplary compositions were used as sealing material for unitary seals of fuel cell plates. The plates were prepared and cured by insert injection molding, and the plates and components of a fuel cell stack were arranged according to the procedure above Example 1. For simplicity and brevity, the assembly and insert injection molding technique are not repeated; just details of the compositions are shown below.

TABLE V

Composition of Silicone Material A

| Parts | Ingredients |
| --- | --- |
| 111.0 | Dimethylvinylsiloxy Terminated Dimethyl Trifluoropropylmethyl Siloxane Copolymer |
| 39.0 | Amorphous Fumed Silica |
| 6.6 | Hexamethyldisilazane |
| 5.0 | 1,3-Diethenyl-1,1,3,3-Tetramethyldisiloxane Platinum Complex |
| 2.9 | Decamethylcyclopentasiloxane |
| 1.0 | Hydroxy Terminated Dimethyl Methylvinyl Polysiloxane Copolymer |

100 parts of a dimethylvinylsiloxy terminated polydimethylsiloxane containing 30 mole percent of methyltrifluoropropyl and having a viscosity of 9,300 cst; one part of an hydroxy terminated dimethylmethylvinyisiloxane having a viscosity of 40 cst; and 39 parts of fumed silica having an average surface area of 250 $m^2/g$ and surface treated with 6.6 parts of hexamethyldisilazane; were blended until homogeneous. After blending, the material was heat treated under a vacuum to remove any volatile components. This formed the silicone base material. The silicone base material was diluted with 11 parts of a dimethylvinylsiloxy terminated polydimethylsiloxane containing 30 mole percent of methyltrifluoropropyl and having a viscosity of 680 cst; 2.9 parts of decamethylcyclopentasiloxane having a viscosity of 25 cst; and 5 parts of a 1,3-diethenyl-1,1,3,3-tetramethyldisiloxane platinum complex containing an amount of platinum metal atoms equaling 0.52 weight percent. The composition was blended until homogeneous. It was a flowable paste capable of being extruded through an ⅛" orifice at a rate of 186.9 g/min under 90 psig pressure.

TABLE VI

Composition of Silicone Material B

| Parts | Ingredients |
| --- | --- |
| 110.0 | Dimethylvinylsiloxy Terminated Dimethyl Trifluoropropylmethyl Siloxane Copolymer |
| 38.0 | Amorphous Fumed Silica |
| 6.4 | Hexamethyldisilazane |
| 3.8 | Dimethyl Hydrogensiloxy Modified Silica |
| 1.0 | Hydroxy Terminated Dimethyl Methylvinyl Polysiloxane Copolymer |
| 0.2 | 1-Ethynyl-1-Cyclohexanol |

100 parts of a dimethylvinylsiloxy terminated polydimethylsiloxane having 30 mole percent of methyltrifluoropropyl and a viscosity of 9,300 cst; one part of an hydroxy terminated dimethylmethylvinylsiloxane having a viscosity of 40 cst; and 38 parts of fumed silica having an average surface area of 250 $m^2/g$ surface treated with 6.4 parts of hexamethyldisilazane; were blended until homogeneous. After blending, the material was heat treated under vacuum to drive off any volatile components. This was used as the silicone base material. The silicone base material was diluted with 10 parts of a dimethylvinylsiloxy terminated polydimethylsiloxane containing 30 mole percent of methyltrifluoropropyl and a viscosity of 680 cst; 38 parts of a dimethylhydrogensiloxy modified silica containing 0.96 weight percent of silicon atom bonded hydrogen and a viscosity of 25 cp; and 0.2 parts of 99 percent pure 1-ethynyl-1-cyclohexanol as the inhibitor. The composition was blended until homogeneous. The material was a flowable paste capable of being extruded through an ⅛" orifice at a rate of 259.5 g/min under 90 psig pressure.

Silicone materials A and B were mixed in a 50:50 ratio, press molded at 171° C. for 5 minutes, and post cured for 4 hours at 200° C. The composition exhibited the characteristics shown below in Table VII.

TABLE VII

Results of Test of Cured Elastomer

| Property | ASTM Method | Result |
|---|---|---|
| Durometer (Shore A) | ASTM D2240 | 44 |
| Tensile, at Break (psi) | ASTM 412 | 693 |
| Elongation at Break (percent) | ASTM 412 | 293 |
| Tear, Die B (ppi) | ASTM 625 | 101 |
| Modulus, at 100 percent Elongation (psi) | ASTM 412 | 193 |

Example 3

Example 2 was repeated except that the mole percent of methyltrifluoropropyl in the dimethylvinylsiloxy terminated polydimethylsiloxane used in Silicone Materials A and B was 40 mole percent and its viscosity was 25,000 centistoke; the mole percent of methyltrifluoropropyl in the dimethylvinylsiloxy terminated polydimethylsiloxane used as a diluent in Silicone Materials A and B was 40 mole percent and its viscosity was 750; and the extrusion rates were 184 g/min. and 225 g/min., respectively. The composition exhibited the characteristics shown below in Table VII.

TABLE VIII

Results of Test of Cured Elastomer

| Property | ASTM Method | Result |
|---|---|---|
| Durometer (Shore A) | ASTM D2240 | 42 |
| Tensile, at Break (psi) | ASTM 412 | 900 |
| Elongation at Break (percent) | ASTM 412 | 420 |
| Tear, Die B (ppi) | ASTM 625 | 130 |
| Modulus, at 100 percent Elongation (psi) | ASTM 412 | 260 |

After one month of exposure according to the accelerated aging test explained in detail in Example 1, the material was not hardened or cracked.

Example 4

Example 2 was repeated except that the mole percent of methyltrifluoropropyl in the dimethylvinylsiloxy terminated polydimethylsiloxane used in Silicone Materials A and B was 70 mole percent and its viscosity was 20,000 centistoke; the mole percent of methyltrifluoropropyl in the dimethylvinylsiloxy terminated polydimethylsiloxane used as a diluent in Silicone Materials A and B was 70 mole percent and its viscosity was 1500; and the extrusion rates were 136 g/min. and 189 g/min., respectively. The composition exhibited the characteristics shown below in Table VII.

TABLE IX

Results of Test of Cured Elastomer

| Property | ASTM Method | Result |
|---|---|---|
| Durometer (Shore A) | ASTM D2240 | 46 |
| Tensile, at Break (psi) | ASTM 412 | 822 |

TABLE IX-continued

Results of Test of Cured Elastomer

| Property | ASTM Method | Result |
|---|---|---|
| Elongation at Break (percent) | ASTM 412 | 384 |
| Tear, Die B (ppi) ASTM 625 | 112 | |

After one month of exposure according to the accelerated aging test explained in detail in Example 1, the material was not hardened or cracked.

Example 5

Seal material of the type described in the previous examples can be used in fuel cell devices in which plate structures include groove profiles having square, circular, or ellipse shapes. However, in tests conducted using standard and state of the art Finite Element Analysis computational techniques, in which the parameters determined included principal stresses and strains, von MISES, and hydrostatic components, it was found that the most suitable groove profiles were circular or elliptical. Thus, in Table X, grooves with a circular profile or an ellipse profile provided reductions in maximum stress of over sixty percent. Finite Element Analysis (FEA) is a computer-aided technique capable of predicting the response of physical systems to external loads.

TABLE X

Finite Element Analysis

| Groove Profile | MISES | MAX Principal, mega Pascal, Mpa | Hydrostatic | Percent Reduction, MAX Principal |
|---|---|---|---|---|
| Square, r = .005" | 8.25 | 8.01 | 3.25 | 0.0 |
| Square, r = .030" | 5.94 | 4.58 | 1.73 | 42.8 |
| Circular | 5.04 | 3.03 | 1.09 | 62.2 |
| Ellipse | 3.14 | 2.60 | 0.86 | 67.5 |

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. In a fuel cell stack assembly having a plurality of plates with grooves for accommodating gaskets to provide seals between individual fuel cell plates in the fuel cell stack assembly in order to prevent leakage of gases and liquids required for operation of the fuel cell stack assembly, the improvement comprising grooves in each fuel cell plate in the fuel cell stack assembly with a circular or an elliptical profile, and a gasket of a sealing material between each fuel cell plate in the fuel cell stack assembly having a profile corresponding to the profile of the grooves in each fuel cell plate; wherein the gasket comprises a sealing material which is a curable sealing material comprising:

(a) 100 parts by weight of a polydiorganosiloxane containing two or more silicon atom bonded alkenyl groups in each molecule;

(b) 5–50 parts by weight of a reinforcing filler;

(c) 1–20 parts by weight of an oxide or hydroxide of an alkaline earth metal with an atomic weight of 40 or greater;

(d) an organohydrogensiloxane containing three or more silicon atom bonded hydrogen atoms in each molecule, the hydrogen atoms being present in an amount providing a molar ratio of silicon atom bonded hydrogen atoms in component (d) to silicon atom bonded alkenyl groups in component (a) in a range of 0.4:1 to 5:1; and (e) a platinum type metal catalyst in an amount providing 0.1–500 parts by weight of platinum type metal per one million parts by weight of component (a).

2. A fuel cell stack assembly according to claim 1 in which an adhesive is applied to the surface of the grooves or an adhesive is included as a component of the sealing material for adhering the gaskets in the grooves.

3. A fuel cell stack assembly according to claim 2 in which the gasket includes at least one upstanding bead extending along its surface for improving sealing relationship between fuel cell plates in the fuel cell stack assembly.

4. A fuel cell stack assembly according to claim 1 wherein the sealing material further comprises:

(f) 0.1–5.0 parts by weight of an organic peroxide in combination with component (e) or in place of component (e);

(g) 0.01–5.0 parts by weight of an inhibitor; and (h) 0.01–100 parts by weight of a non-reinforcing extending filler.

5. A fuel cell stack assembly according to claim 1 wherein the polydiorganosiloxane of component (a) is a vinyl terminated polydimethylsiloxane having a viscosity of at least 55 Pa·s (55,000 cP) or a blend of lower and higher viscosity vinyl containing polydimethylsiloxanes such that the viscosity of the blend is at least 55 Pa·a (55,000 cP).

6. A fuel cell stack assembly according to claims 1 wherein component (a) is a vinyl terminated methyltrifluoropropylsiloxane dimethylsiloxane copolymer in which the mole percent of methyltrifluoropropyl is 10–100 mole percent.

7. A fuel cell stack assembly according to claim 1 wherein component (a) is a vinyl terminated diphenylsiloxane dimethylsiloxane copolymer in which the mole percent of diphenylsiloxane is 2–50 mole percent.

8. A fuel cell stack assembly according to claim 1 wherein component (e) is encapsulated in a thermoplastic organic polymer.

9. A fuel cell stack assembly according to claim 1 wherein component (e) is an organic peroxide instead of a platinum type metal catalyst, and it is present in an amount of 0.5–5.0 parts per 100 parts of the sealing material, and the sealing material is cured by heating it to a temperature of 100–200° C.

10. A fuel cell stack assembly according to claim 1 wherein the curable sealing material further comprises:

(i) 0.1–20 parts by weight of an adhesion promoter, the adhesion promoter being an epoxy containing organosilicon compound, the adhesion promoter being added to the curable sealing material before it is cured.

* * * * *